United States Patent [19]

Sjöstrand

[11] Patent Number: 4,856,646

[45] Date of Patent: Aug. 15, 1989

[54] CONVEYOR ASSEMBLIES

[75] Inventor: Uno Sjöstrand, Flyinge, Sweden

[73] Assignee: Aktiebolaget Profor, Lund, Sweden

[21] Appl. No.: 140,138

[22] Filed: Dec. 31, 1987

[30] Foreign Application Priority Data

Jan. 22, 1987 [SE] Sweden .............................. 8700242

[51] Int. Cl.$^4$ .............................................. B65G 15/00
[52] U.S. Cl. .................................. 198/836; 198/841; 198/860.2
[58] Field of Search ............... 198/836, 841, 813, 818, 198/860.2, 839, 837

[56] References Cited

U.S. PATENT DOCUMENTS

| | | | |
|---|---|---|---|
| 3,187,944 | 6/1965 | Stock | 198/813 |
| 3,491,873 | 1/1970 | Fauth | 198/841 X |
| 3,507,380 | 4/1970 | Sarovich et al. | 198/841 X |
| 3,708,059 | 1/1973 | Ackermann | 198/841 |
| 3,739,904 | 6/1973 | Windstrup | 198/836 |
| 3,783,584 | 1/1982 | Rauser . | |
| 3,848,732 | 11/1974 | Catalano | 198/836 |
| 3,854,688 | 12/1974 | Shuford | 198/836 X |
| 4,362,075 | 12/1982 | Utsumi . | |
| 4,573,957 | 5/1986 | Billberg . | |
| 4,584,819 | 4/1986 | Hakansson . | |
| 4,682,684 | 7/1987 | Löthman . | |
| 4,709,799 | 12/1987 | Ljungberg . | |
| 4,732,268 | 3/1988 | Sjostrand . | |

FOREIGN PATENT DOCUMENTS

| | | |
|---|---|---|
| 7805744 | 2/1978 | France . |
| 7901859 | 3/1979 | France . |
| 81012395 | 2/1981 | Sweden . |
| 79026936 | 1/1982 | Sweden . |

Primary Examiner—Robert J. Spar
Assistant Examiner—James R. Bidwell
Attorney, Agent, or Firm—Burns, Doane, Swecker & Mathis

[57] ABSTRACT

Conveyor assemblies, which by way of an endless chain, move foodstuff packages between different processing machines are customary in e.g. the dairy industry. Up to now the conveyor assembly generally was "tailor-made" for each dairy, which entails unnecessary cost and other difficulties. In accordance with the present invention a conveyor assembly of a modular design is proposed which makes it easily adaptable to differnt needs and localities. More particularly, an intermediate guideway for an endless chain is made use of as a spacer element between supporting sides of the assembly, thus providing a simple and stable construction. Similarly shaped fastening devices, moreover, serve as joint pieces between different guideway sections, thus facilitating fitting-up and reducing cost.

2 Claims, 4 Drawing Sheets

CONVEYOR ASSEMBLIES

The present invention relates to a conveyor assembly.

BACKGROUND OF THE INVENTION

Conveyor assemblies of the type which by means of a motor-driven endless belt or an endless chain move goods between different positions have a wide range of applications. Within the diary industry, chain conveyors are made use of for the transport of, among others, packing containers for milk between, or from, different packaging or processing machines. Up to now conveyor assemblies for this purpose generally were "tailor-made" with the help of a great number of more or less specially manufactured components. The result frequently has been an expensive and complicated design, which owing to the large number of components was difficult to set up, and which owing to the great number of joints tended to become unstable after prolonged usage. Since pockets and recesses are unavoidable at the points of joining, the cleaning is made considerably more difficult, which is a major disadvantage in the foodstuff industry. A frequently defective guidance of the conveying chain also entails unnecessary wear on the chain as well as on the packages and consequent fouling of the system.

OBJECTS AND SUMMARY

It is an object of the present invention to provide a conveyor assembly with a well thought-out design which makes it possible to avoid the above-mentioned disadvantages and to provide a conveyor assembly which is stable and easy to set up.

It is a further object of the present invention to provide a conveyor assembly which reduces the problems of fouling and dirt-collecting pockets existing up to now.

It is a further object of the present invention to provide a conveyor assembly, which in spite of comprising a relatively small number of components, nevertheless is easy to set up and to adapt to different localities and fields of application.

The abovementioned objects and others have been achieved in that a conveyor assembly has been given the characteristic that the slideway serves as a spacer element between the supporting sides so that these are fixed at a predetermined distance from one another.

By making use of the slideway as a spacer element between the supporting sides, the latter, after setting-up will be fixed at a predetermined distance from one another and in a very steady and immovable manner which is not impaired during prolonged operation. The modular system ensures that the conveyor assembly will be easy to set-up and to adjust and simple to adapt to local conditions, at the same time as the relatively small number of joints and other difficultly accessible recesses makes for a satisfactory cleaning effect. The effective stretching and the guiding of conveying chain and the goods transported on the same minimize wear and ensure good function even after usage over a long period.

DESCRIPTION OF THE DRAWINGS

A preferred embodiment of the conveyor assembly in accordance with the present invention will now be described in more detail with special reference to the attached drawings which only show the details indispensable for an understanding of the invention.

DETAILED DESCRIPTION

Figure 1:
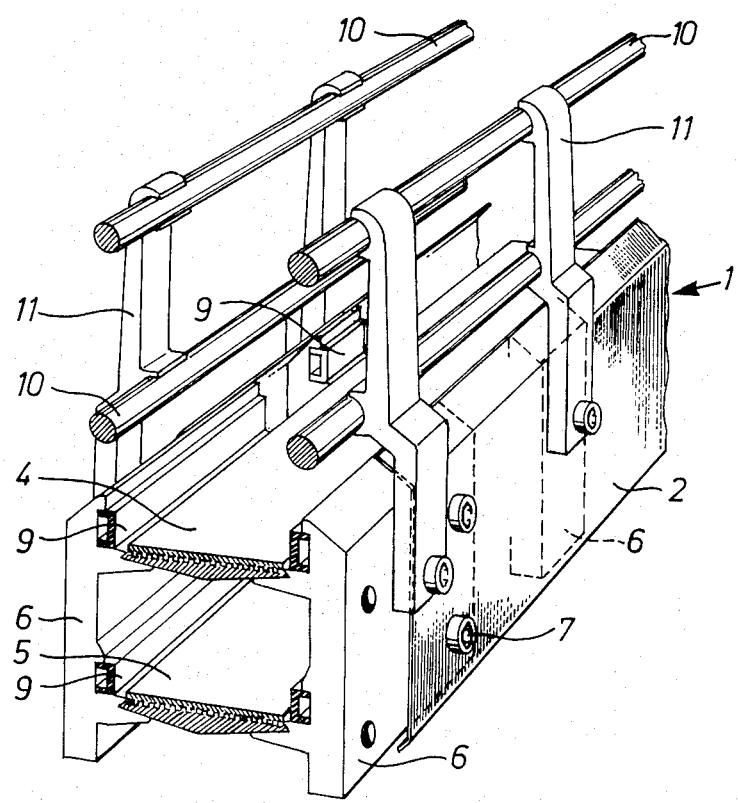
FIG. 1 is a perspective view of a part of the conveyor assembly in accordance with the invention during fitting-up.

The conveyor assembly according to the present invention comprises a number of supporting parts 1 of different predetermined lengths which can be joined together to a desired length. Each supporting part 1 comprises two mirror-symmetrical supporting sides 2 between which run the upper and lower portion respectively of a conveying chain 3. The distance between the supporting sides is determined by slideways 4,5 located between the supporting sides, on which run the two portions of the chain 3. In other words, the slideways 4,5 serve as spacer elements between the supporting sides 2 so that these are fixed at a predetermined distance from one another. More particularly the, longitudinal edges of the slideways 4,5 engage in grooves in fastening devices 6 which are located at uniform intervals on the inside of the supporting sides 2. The said grooves in the fastening devices 6 are adapted so that the slideways 4,5 assume a position at a substantially right angle to the vertical surfaces of the supporting sides 2. As a result, the supporting sides 2, together with the fastening devices 6 and the slideways 4,5, form a unit of substantially square cross section (FIG. 2), which makes the supporting parts 1 particularly firm and stiff against torsion. The supporting sides 2 and the fastening devices 6 are pressed together against the slideways 4,5 with the help of bolts 7 and internally threaded sockets 8 which are located directly underneath the respective slideways 4,5 and extend through through-holes in the fixing devices 6 as well as the supporting sides 2.

The V-shape of the grooves present in the fastening devices 6 entails that even a relatively loose tightening of the bolts 7 causes a firm wedging of the slideways 4,5 in correct position, thus contributing effectively to the good precision and stability of the construction. In the fastening devices 6, moreover, a number of guide pieces 9 are present, which are manufactured from any suitable plastic material and are located directly above the upper surfaces of the slideways 4,5 so as to serve as lateral guides for the conveying chain 3 moving on the slideways 4,5.

Figure 2:
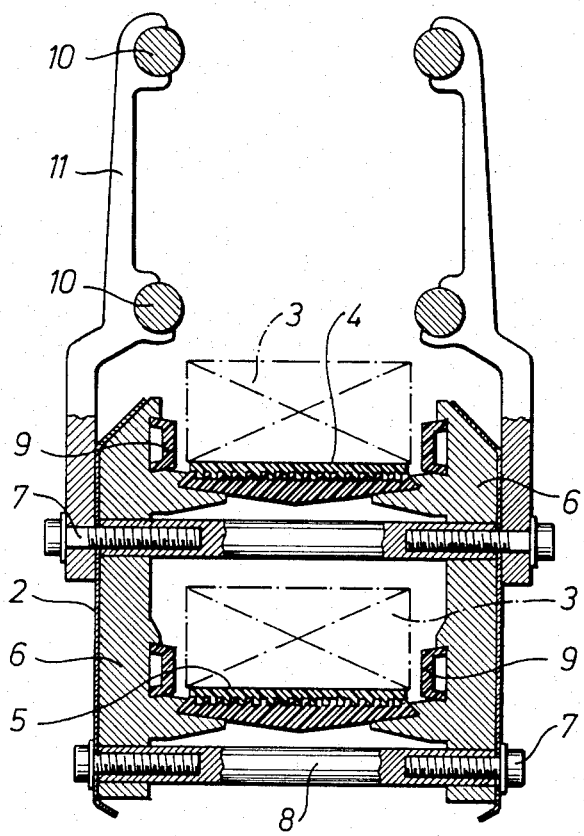
FIG. 2 is a view partly in cross section of the conveyor assembly in accordance with FIG. 1.

The upper, active portion of the conveying chain 3, when resting against the slideway 4, as is evident from FIG. 2, is located with its upper surface above the two top edges of the supporting sides 2. To provide lateral guidance of the packing containers transported on the conveying chain 3, the conveyor assembly in accordance with the invention comprises a number of parallel guides 10 extending at a distance above the supporting sides 2 which are supported by means of vertical brackets 11 situated at uniform intervals along the supporting parts, which brackets are provided with snap-on mountings for the guides 10. The brackets 11 are provided at their bottom ends with fastening holes, by means of which the brackets are joined to the supporting sides 2 and the fastening devices 6 with the help of the bolts 7 mentioned earlier. The brackets 11 may be of varying design to allow adapting to the packing containers which are to be transported on the conveyor in question, and instead of the design shown in FIG. 2 the brackets 11 may be straight or bent outwards so that the distance between the guides 10 is greater and permits the passage of wider packing containers on the conveyor.

As mentioned earlier, each bracket 11 is situated at a predetermined point along the supporting side 2, which is predrilled. To make possible the attachment of the bracket 11, a fastening device 6 is used inside the supporting side, and at each bracket, therefore, the supporting sides 2 will be fixed at a certain distance from one another with the help of the bolts 7 and the spacer sockets 8. The fastening devices 6 here are of a width which coincides with, or exceeds, the width of the brackets 11, but at the points where two supporting parts 1 are to be joined together another type of fastening device 6 occurs which is of appreciably greater width and, besides allowing the attachment of the brackets 11, also serves as a joint piece for the joining of two supporting parts to one another (FIG. 1). The fastening device 6 or the joint piece here has been provided with four screw holes for joining the supporting sides 1 to one another and two further screw holes to make possible the attachment of the bracket 11. The fastening devices 6 intended for bracket attachment as well as the fastening devices serving as joint pieces are of identical section which makes it possible to manufacture them in a simple manner from extruded aluminium. The brackets 11 too are manufactured in a manner which makes it possible to produce the parts with high precision and at relatively low cost.

Figure 3:
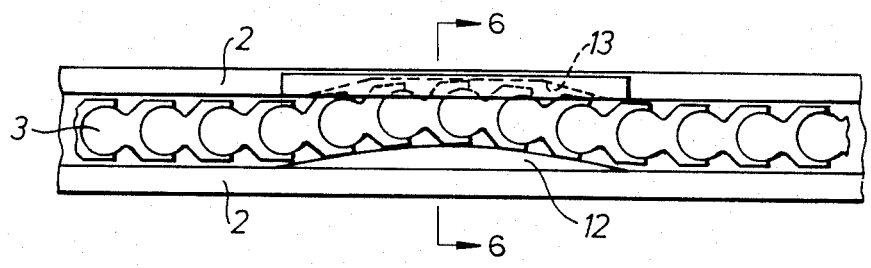
FIG. 3 is a view of a portion of a supporting part from the top, the guides and brackets mounted on the supporting part having been removed for the sake of clarity.
Figure 6:
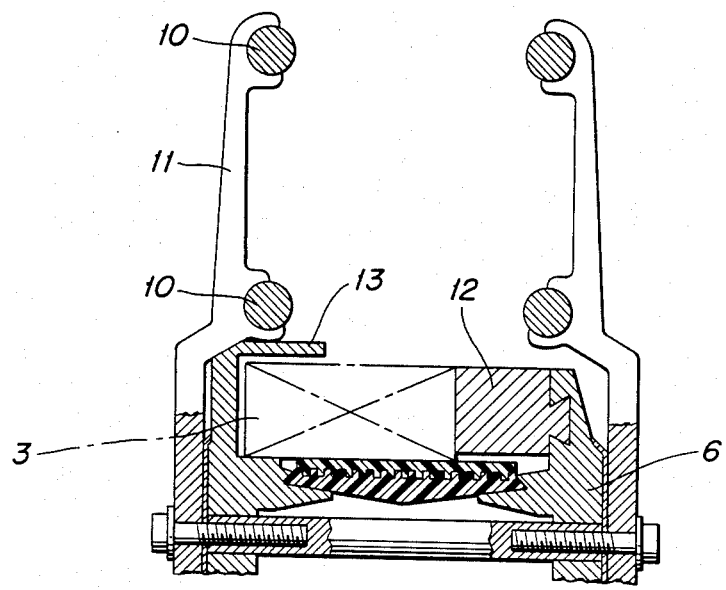
FIG. 6 is a cross-sectional view of the upper portion of the conveyor assembly along the line 6—6 in FIG. 3.

As is evident from the above, the conveying chain 3 during operation is located on the slideways 4,5 which are manufactured from extruded aluminium and provided with an upper surface or slideway of suitable low-friction material, e.g. thermoplastics. The thermoplastic material engages mechanically in the top surface of the aluminium section which is provided with an uneven profile, e.g., of dovetail-type (FIG. 2). The lateral guidance of the chain 3 is provided by the guide pieces 9, which likewise are manufactured from low-friction material and are arranged at uniform intervals along the length of the supporting part, more particularly at the points where the fastening devices 6 are situated. The chain 3 thus rests under its own weight on the underlying slideway 4,5, which functions well except in the cases where the chain passes a lower lying portion of the conveyor, that is to say where the support parts are bent in the vertical direction and form a "valley". At such points during operation of the conveyor the chain 3 will be stretched owing to the tensile force in the chain so that it tends to lift off the underlying slideway 4. The conveyor assembly in accordance with the invention has been provided, therefore, with elements adapted to prevent lifting of the chain, these elements are shown in FIGS. 3 and 6 and include a projection 12 for the lateral guidance of the chain underneath a slide rail 13 co-operating with the top surface of the chain. The projection 12 is of a width which substantially amounts to a third of the free space between two guide pieces 9 situated opposite one another and of a height which is equal to, or slightly less than, the height of the chain 3. The projection 12 is of an elongated convex shape and is situated along the inside of one supporting side 2 where it replaces a guide piece 9 so that the chain 3, when it passes the projection 12, is forced to move sideways underneath the slide rail 13 located at a recess in the upper part of the opposite supporting side 2, whose lower surface is a little above the top surface of the chain 3, and as a result of resting against the same prevents the chain 3 from being lifted when the chain is stretched. Packages transported on the chain 3 can continue unhindered straight on past the particular portion of the supporting part, since they are guided during the passage by the slide rail 13 and the guides not shown in FIG. 3, so that they slide partly on the chain 3, partly on the top surface of the projection 12. The chain 3 is of known design which is hinged in the vertical as well as in the horizontal direction.

Figure 4:
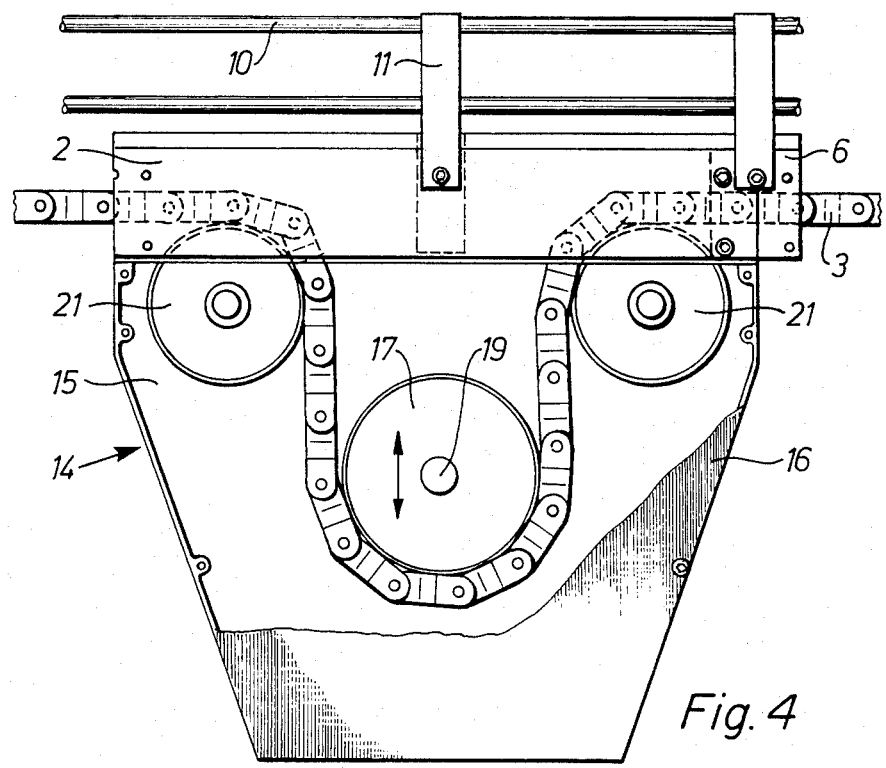
FIG. 4 is a view from the side and partly in cross section of a portion of a supporting part with a chain stretching arrangement in accordance with the present invention.
Figure 5:
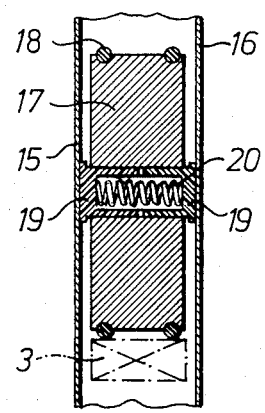
FIG. 5 is a cross sectional view of a part of the chain stretching arrangement in accordance with FIG. 4.

As mentioned earlier, it is important for optimizing the function of the conveyor assembly and for minimizing wear and thereby any instability arising, that the chain should be kept stretched with a constant force during the whole time. This is ensured in the conveyor assembly in accordance with the invention with the help of a chain-stretching arrangement 14 (FIG. 4, 5) which is located at a suitable place along the conveyor assembly. There is an interruption in the lower slideway 5 at the location of the chain-stretching arrangement 14, where the support sides 2 are extended downwards by means of guide panels 15, 16. The chain 3 runs down between the guide panels 15, 16 and around a freely suspended wheel 17, which by its weight is adapted to produce the required stretching of the chain. The wheel 17 which is illustrated in more detail in FIG. 5 is made of a material of appropriate weight, e.g. stainless steel, and comprises around its periphery a friction-enhancing arrangement, e.g., two rubber rings 18 on which rests the conveying chain 3. In the centre hole of the wheel 17 are two guide pins 19 which, with the help of a helical compression spring 20 located between them, are pressed against the two guide panels 15, 16 with a predetermined force, so that on movement of the wheel 17 the friction produced between surfaces of the guide pins 19 and the guide panels 15,16 facing one another produces braking of the movement of the wheel 17 and prevents unnecessary pivoting, above all in vertical direction, thus imparting to the return portion of the conveying chain 3 a steady movement and even progress. The weight of the wheel 17 can be adapted to the length of the chain which the chain-stretching arrangement 14 is intended to work with, so that optimum function is achieved. The chain 3 is conducted to the wheel 17 via wheels 21 located at the end parts of the slideway 5, which may be suspended so that they can rotate freely in the chain-stretching arrangement 14 or they may comprise a driving wheel which is connected to an electric motor, not shown, and adapted to propel the conveying chain along at a predetermined speed. Naturally the driving may be arranged also at some other, arbitrary point along the length of the conveyor assembly. Such an arrangement, however, is well-known and therefore does not have to be described in greater detail in this context The conveyor assembly in accordance with the invention with the help of the design described is made into a very flexible and easily installed system which may be adapted to a great number of different operational situations. With the help of conventional points arrangements and track curves of known type (e.g., of the type as described in the Swedish patent application No. 8502241-7) and other accessories known in themselves the conveyor assembly is particularly well suited for the handling of packing containers in the dairy industry.

Although only preferred embodiments are specifically illustrated and described herein, it will be appreciated that many modifications and variations of the present invention are possible in light of the above teachings and within the purview of the appended claims without departing from the spirit and intended scope of the invention.

I claim:

1. A conveyor assembly with supporting parts able to be joined together to a required length, comprising:
    two supporting sides;
    a first slideway for an endless chain;
    said first slideway being mounted between said two supporting sides to serve as a spacer element between the supporting sides so that the supporting sides are fixed at a predetermined distance from one another;
    a second slideway arranged at some distance underneath the first slideway;
    guide panels at the second slideway so arranged that the supporting sides are extended downwards by means of said guide panels, between which is located a wheel freely suspended in the chain and adapted so that by its weight the required stretching of the chain is produced; and
    further comprising a guide pin and a spring, wherein the wheel is guided by means of the guide pin which is located in a center hole of the wheel and adapted so that the guide pin is pressed outwards against the guide panels by means of the spring.

2. A conveyor assembly in accordance with claim 1, further comprising means for preventing lifting off of the chain, said preventing means comprising a slide rail cooperating with a top surface of the chain and a projection for the lateral guidance of the chain underneath the slide rail.

* * * * *